(12) United States Patent
Belmekki et al.

(10) Patent No.: US 12,013,290 B2
(45) Date of Patent: Jun. 18, 2024

(54) DEVICE FOR MEASURING TEMPERATURES IN A HEAT EXCHANGER

(71) Applicant: L'Air Liquide, Société Anonyme pour l'Etude et l'Exploitation des Procédés Georges Claude, Paris (FR)

(72) Inventors: Younes Belmekki, Vélizy-villacoublay (FR); Ahlem Delegue, Paris (FR); Paul Berhaut, Saint Cyr l'Ecole (FR); Marc Wagner, Saint Maur des Fosses (FR); Natacha Haik, Champigny-sur-arne (FR); Ludovic Amant, Vaires sur Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 153 days.

(21) Appl. No.: 17/472,109

(22) Filed: Sep. 10, 2021

(65) Prior Publication Data
US 2022/0082448 A1 Mar. 17, 2022

(30) Foreign Application Priority Data
Sep. 11, 2020 (FR) ..................................... 2009231

(51) Int. Cl.
*G01K 1/14* (2021.01)
*F28D 9/00* (2006.01)
(Continued)

(52) U.S. Cl.
CPC .............. *G01K 1/14* (2013.01); *F28D 9/0068* (2013.01); *F28D 9/0093* (2013.01); *F28F 3/025* (2013.01); *G01K 13/026* (2021.01)

(58) Field of Classification Search
CPC ...... G01K 13/024; G01K 13/026; G01K 1/14; F28D 9/0093; F28F 2215/04
See application file for complete search history.

(56) References Cited

U.S. PATENT DOCUMENTS

| | | | | |
|---|---|---|---|---|
| 4,463,800 A | * | 8/1984 | Hadden ................... | F28F 27/00 123/41.15 |
| 6,095,236 A | * | 8/2000 | Kuhler .................... | B29C 48/83 219/535 |

(Continued)

FOREIGN PATENT DOCUMENTS

| | | |
|---|---|---|
| DE | 10 2009 042 994 | 3/2011 |
| DE | 10 2016 000 246 | 7/2017 |

(Continued)

OTHER PUBLICATIONS

Translation of Patent Document JP2004020108A entitled Translation-JP2004020108A (Year: 2023).*

(Continued)

*Primary Examiner* — Paul Alvare
(74) *Attorney, Agent, or Firm* — Elwood L. Haynes

(57) ABSTRACT

The invention relates to a heat exchanger of the brazed plate and fin type including a stack of plates arranged parallel to one another and to a longitudinal direction so as to define, between the plates, a plurality of passages suitable for the flow of at least a first fluid in the longitudinal direction, at least one exchange structure of corrugated shape being arranged between two successive plates and having corrugation crests and corrugation troughs connected alternately by a succession of fins. The fins succeeding one another in a lateral direction which is orthogonal to the longitudinal direction and which defines a direction of corrugation of the exchange structure, and the corrugation crests and troughs being arranged against the plates and having a thickness measured parallel to a direction of stacking which is perpendicular to the longitudinal direction and to the lateral direction.

3 Claims, 3 Drawing Sheets

(51) Int. Cl.
*F28F 3/02* (2006.01)
*G01K 13/02* (2021.01)

(56) References Cited

U.S. PATENT DOCUMENTS

| | | | | |
|---|---|---|---|---|
| 2005/0274501 | A1* | 12/2005 | Agee | F02M 26/22 |
| | | | | 165/146 |
| 2006/0284723 | A1* | 12/2006 | Ha | G01K 3/14 |
| | | | | 374/E7.004 |
| 2010/0212861 | A1* | 8/2010 | Setsu | F24F 13/30 |
| | | | | 165/122 |
| 2011/0139392 | A1* | 6/2011 | Arzberger | B22D 2/006 |
| | | | | 164/151.4 |
| 2011/0282619 | A1* | 11/2011 | Laursen | G01K 13/02 |
| | | | | 702/182 |
| 2015/0241141 | A1* | 8/2015 | FLuggen | F28F 27/00 |
| | | | | 165/287 |
| 2015/0241142 | A1* | 8/2015 | Vallee | F28D 1/0341 |
| | | | | 165/185 |
| 2018/0283815 | A1* | 10/2018 | Victor | F28F 19/00 |
| 2020/0215634 | A1* | 7/2020 | Flueggen | B23K 1/19 |
| 2020/0348018 | A1* | 11/2020 | Forsberg | F22B 33/04 |
| 2021/0231382 | A1* | 7/2021 | Steinbauer | F28D 9/0062 |
| 2022/0082448 | A1* | 3/2022 | Belmekki | F28D 9/0093 |

FOREIGN PATENT DOCUMENTS

| | | | |
|---|---|---|---|
| EP | 3 680 598 | 7/2020 | |
| GB | 617461 A * | 2/1949 | |
| GB | 2527847 | 1/2016 | |
| JP | 2004020108 A * | 1/2004 | F28D 1/0316 |
| WO | WO 2014 056587 | 4/2014 | |
| WO | WO 2019 015805 | 1/2019 | |
| WO | WO 2019 206455 | 10/2019 | |

OTHER PUBLICATIONS

French Search Report for corresponding FR 2009231, dated May 6, 2021.

* cited by examiner

DEVICE FOR MEASURING TEMPERATURES IN A HEAT EXCHANGER

CROSS REFERENCE TO RELATED APPLICATIONS

This application claims the benefit of priority under 35 U.S.C. § 119 (a) and (b) to French Patent Application No. 2009231, filed Sep. 11, 2020, the entire contents of which are incorporated herein by reference.

BACKGROUND

The present invention relates to a heat exchanger of the brazed plate and fin type, comprising at least one temperature probe to make it possible to take measurements of temperatures of at least one fluid circulating through the exchanger.

The present invention notably finds application in the field of the cryogenic separation of gases, in particular the cryogenic separation of air, in what is known as an ASU (air separation unit) used to produce pressurized gaseous oxygen. In particular, the present invention may apply to the manufacture of a heat exchanger that vaporizes a flow of liquid, for example liquid oxygen, nitrogen and/or argon, by exchanging heat with a gaseous flow, for example air or nitrogen.

The present invention may also apply to a heat exchanger that vaporizes at least one flow of liquid-gas mixture, in particular a flow of multi-constituent mixture, for example a mixture of hydrocarbons, through exchange of heat with at least one other fluid, for example natural gas.

One technology that is commonly used for heat exchangers is that of brazed plate heat exchangers, which make it possible to obtain highly compact components that afford a large heat-exchange surface area and low-pressure losses. These exchangers are formed by a set of parallel plates between which spacer elements, such as corrugated structures or corrugations, which form fin heat exchange structures, are generally inserted. The stacked plates form, between one another, a stack of flat passages for different fluids to be brought into a heat exchange relationship.

During the manufacture of the exchanger, the plates, the fin spacer elements and the other constituent elements of the exchanger are pressed against one another and are subsequently joined together by brazing in a vacuum furnace at temperatures that may be between 550 and 900° C.

On account of their compactness and their monolithic construction, it is very difficult to take local measurements of temperatures within these brazed heat exchangers. Thus, in the vast majority of the methods in which they are implemented, the operator can access only the total thermal power exchanged between fluids, by virtue of an energy balance that is performed between the inlet and the outlet for each fluid.

This makes it much harder to characterize these exchangers and does not make it possible, for example, to separately measure the heat-exchange coefficient of each of the passages.

During use, the lack of local data limits the control possibilities for the method. In particular, certain particular physical phenomena that can occur within the exchanger, such as phase changes or chemical reactions, manifest themselves in a local variation of the temperature, which also depends on the position in question in the exchanger.

The local measurement of temperatures would allow in situ detection of poor operating conditions of the exchangers: poor distribution of the fluids, reduction in the performance of certain areas of the exchanger due, for example, to blocking or local distillation phenomena. It is also helpful to benefit from local measurements of temperatures or of heat flows in order to monitor the change in performance of plate and fin heat exchangers over the course of their lifetime.

In the face of these requirements, it has been found that the existing temperature measurement solutions are not entirely satisfactory, in particular on account of the complexity of the retaining components that are used or the implementation thereof.

"In-situ" temperature measurement methods do exist, but are often too intrusive because they excessively alter the flows of the fluids within the heat-exchange passages. Furthermore, because they are not provided from the time of construction of the exchanger, their implementation is relatively complex, expensive and not very robust. Other methods allow temperatures to be measured only indirectly and their precision may prove insufficient for certain methods.

SUMMARY

The particular aim of the present invention is to overcome all or some of the abovementioned problems by proposing a brazed plate heat exchanger that makes it possible to take direct and local measurements of the temperatures of the fluids circulating within the exchanger, and do so in a manner that is more precise, both in terms of the measured value and of the position in the exchanger, while at the same time minimizing the disruption to the operation of the exchanger and the flow of the fluids, and without, increasing the space required by the exchanger.

To this end, the subject-matter of the invention is a heat exchanger of the brazed plate and fin type comprising a stack of plates arranged parallel to one another and to a longitudinal direction so as to define, between said plates, a plurality of passages suitable for the flow of at least a first fluid in the longitudinal direction, at least one exchange structure of corrugated shape being arranged between two successive plates and comprising corrugation crests and corrugation troughs connected alternately by a succession of fins, said fins succeeding one another in a lateral direction which is orthogonal to the longitudinal direction and which defines a direction of corrugation of the exchange structure, and the corrugation crests and troughs being arranged against the plates and having a thickness measured parallel to a direction of stacking which is perpendicular to the longitudinal direction and to the lateral direction, the exchange structure having a total height measured parallel to a direction of stacking, characterized in that at least one slot is formed through the exchange structure in a direction perpendicular to the longitudinal direction, a temperature probe being arranged in the slot, said slot being formed from the corrugation crests over a predetermined height, measured in the direction of stacking, which is greater than the thickness of the corrugation crests.

Depending on the case, the exchanger according to the invention may comprise one or more of the features listed below.

The temperature probe is selected from: a resistive probe, notably a platinum resistance sensor; a thermocouple temperature probe; a thermistor temperature probe.

The temperature probe is configured to measure the temperature at a desired point of at least a first fluid flowing between two successive plates, and to do so in such a way that the heat-sensitive part is in direct contact with said at least one first fluid.

The exchange structure has a total height measured parallel to a direction of stacking, the predetermined height of the slot being equal to at least 25% of the total height and/or at most 75% of the total height, preferably between 25 and 75% of the total height.

The slot has a width, measured parallel to the longitudinal direction, of between 0.6 and 5 mm, preferably between 1 and 4 mm.

The exchange structure has a total length measured in the lateral direction and comprises at least one slot extending, in the lateral direction, over a predetermined length of between 25 and 75% of the total length of the exchange structure.

The exchanger comprises at least one slot resulting from the exchange structure being perforated using machining, electrical-discharge machining, or cutting, particularly plasma-, laser- or waterjet cutting.

The exchange structure comprises several corrugation pads juxtaposed in the longitudinal direction, at least one slot being defined by a gap formed between two adjacent corrugation pads.

The exchange structure is of the partial offset serrated type comprising several corrugations each comprising a series of corrugation crests and of corrugation troughs alternately connected by a succession of fins, at least some of said corrugations having a predetermined offset in the lateral direction with respect to another, adjacent, corrugation, said corrugations having lengths known as serration lengths measured in the longitudinal direction, the width of the slot, measured parallel to the longitudinal direction, being comprised between 15 and 90%, preferably between 20 and 50% of the serration length.

The passages are delimited by closure bars positioned between the plates, at least one closure bar extending parallel to the longitudinal direction and comprising at least one recess, said recess communicating on the one hand with the slot and on the other hand with the outside of the stack.

The temperature probe projects to outside the stack via the recess and then via a coupling which is fixed, preferably welded, to the closure bar in the continuation of the recess, the coupling being configured to ensure a fluidtight seal between the recess and the outside of the stack.

The slot extends between a first end configured for the insertion of the temperature probe and a second end arranged within the passage and receiving the end of the probe, the slot having, at one and/or the other of said first and second ends, an increase in its width and/or in its height so as to form a first cavity and/or a second cavity at said first and/or second ends.

Said at least one passage is delimited between two opposite closure bars extending parallel to the longitudinal direction, the exchange structure comprising at least a pair of slots which extend from each closure bar facing one another, the slots of the pair potentially meeting one another to form a single slot passing across the entire passage.

The exchange structure comprises a plurality of slots positioned along the longitudinal direction at predetermined intervals.

The predetermined intervals vary along at least part of the exchange structure, the intervals preferably increasing in the longitudinal direction.

The exchange structure is divided, in the longitudinal direction, into at least two portions, that one of the two portions that is situated downstream of the other one having intervals between the slots that are greater than the intervals of the other one of the two portions.

BRIEF DESCRIPTION OF THE DRAWINGS

The invention will now be understood better by virtue of the following description, which is given by way of non-limiting example and with reference to the appended figures, in which.

DETAILED DESCRIPTION OF PREFERRED EMBODIMENTS

Figure 1:
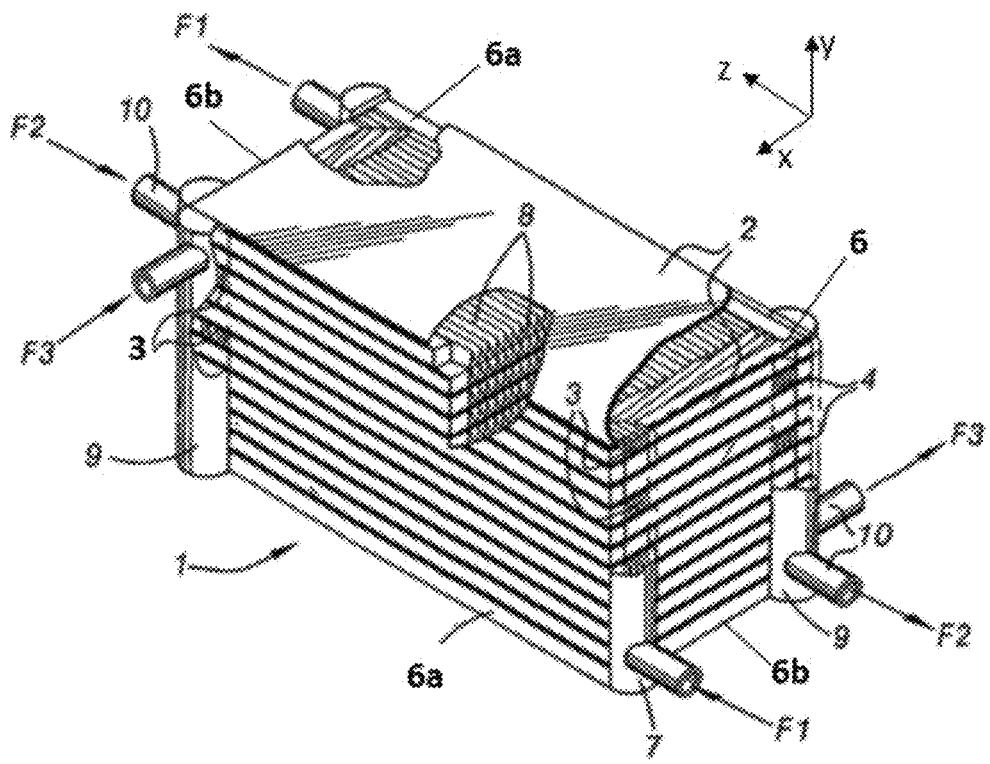
FIG. 1 is a schematic three-dimensional view of a brazed plate heat exchanger according to one embodiment of the invention.

FIG. 1 shows a heat exchanger 1 of the brazed plate and fin type comprising a stack of plates 2 that extend in two dimensions, length and width, in the longitudinal direction z and the lateral direction x, respectively. The plates 2 are disposed on top of one another, parallel to one another, and in a spaced-apart manner. They thus form a plurality of sets of passages 3 between one another, with some passages being provided for the flow of a first fluid F1 and other passages being provided for the flow of at least one other fluid F2, F3 to be brought into an indirect heat-exchange relationship with F1 via the plates 2. The lateral direction x is perpendicular to the longitudinal direction z and parallel to the plates 2. The fluids flow preferably along the length of the exchanger parallel to the longitudinal direction z, the length being great in comparison with the width of the exchanger.

Preferably, each passage 3 has a flat and parallelepipedal shape. The spacing between two successive plates 2, corresponding to the height of a passage, measured in the stacking direction y of the plates 2, is small compared with the length and the width of each successive plate. The stacking direction y is orthogonal to the plates.

The passages 3 are delimited by closure bars 6a, 6b placed between the plates 2 at the periphery of the passages 3. These bars 6a, 6b provide the spacing between the plates 2 and define the peripheral edges of the passages. At least one closure bar 6a extends in the longitudinal direction z, which means to say that the bar 6a is parallel to the direction z, and preferably the passage 3 is delimited between a pair of parallel bars 6a, and at least one closure bar 6b extends in the lateral direction x, which means to say that the bar 6b is parallel to the direction x, and preferably the passage 3 is delimited between a pair of bars 6b which are parallel to the lateral direction x.

Depending on the location of the regions at which fluid is introduced into and discharged from the exchanger, it is possible that the closure bars 6a, 6b do not completely obstruct the passages but leave free openings for the inlet or the outlet of the corresponding fluids. The exchanger 1 comprises semi-tubular manifolds 7, 9 provided with inlets and outlets 10 for introducing fluids into the exchanger 1 and for discharging fluids out of the exchanger 1. These manifolds have openings that are narrower than the passages.

Distribution zones arranged downstream of the inlet manifolds and upstream of the outlet manifolds are used to homogeneously channel the fluids to or from the entire width of the passages.

Figure 4:
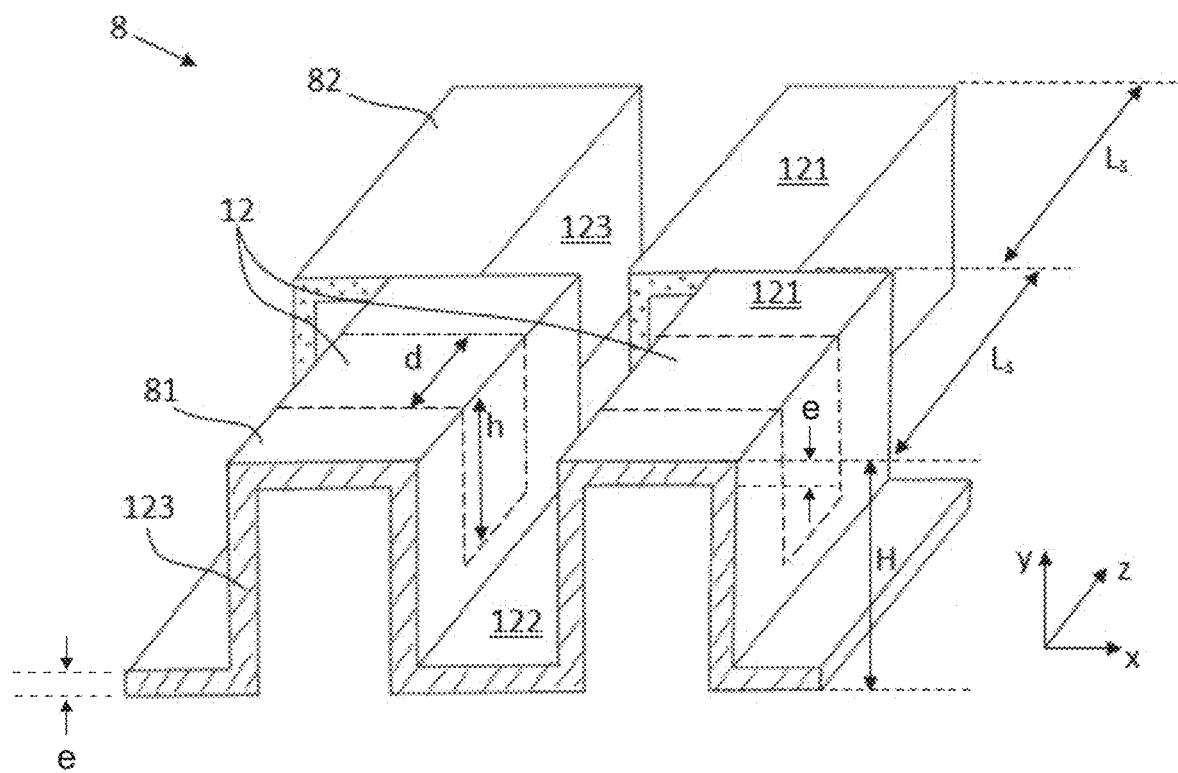
FIG. 4 is a schematic three-dimensional view of an exchange structure according to one embodiment of the invention, FIG. 5 schematically shows various views of a slot according to some embodiments of the invention.
Figure 5:
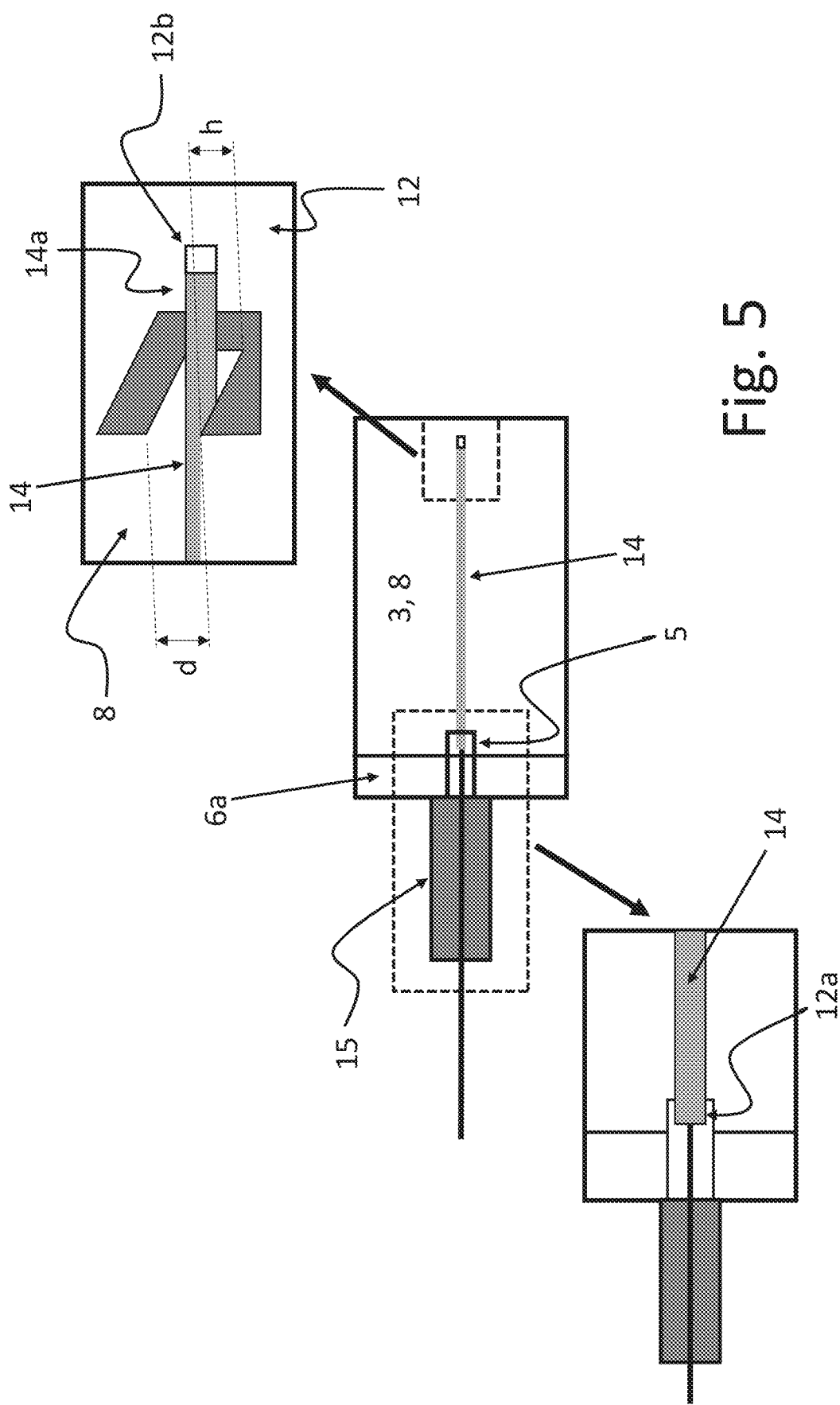

At least some of the passages 3 comprise at least one heat exchange structure 8 with fins which extends across the width and along the length of the passages of the exchanger, parallel to the plates 2. The exchange structure 8, also referred to as spacer elements, comprises at least one heat-exchange corrugation in the form of a corrugated sheet. In this case, the corrugation legs that connect the successive crests 121 and troughs 122 of the corrugation 8 are referred to as "fins" 123. Examples of corrugated exchange structures 8 are shown in FIGS. 4 and 5. The fins 123 runs parallel to the longitudinal direction z and succeed one another in the lateral direction x which defines an overall direction of corrugation of the exchange structure 8. The corrugation legs form secondary heat-exchange surfaces which extend from the primary heat-exchange surfaces formed by the plates 2 of the exchanger. The corrugation crests and the corrugation troughs have a thickness e measured parallel to the direction of stacking y. The exchange structure 8 has a total height H, measured parallel to the direction of stacking y, which is preferably equal to, or very slightly less than, the height of the passage 3 in which it is inserted.

It is to be noted that FIG. 1 shows straight exchange corrugations 8 arranged in the passages of the exchangers. Of course, any type of corrugation is conceivable, in particular non-perforated straight corrugations, "herringbone" corrugations, which are also called "wavy" corrugations, and partially offset (serrated) corrugations such as those illustrated in the example of FIG. 5.

As a preference, during the manufacture of the exchanger 1, a set of plates 2 is provided that are stacked parallel to one another and to the longitudinal direction z. The plates 2 are spaced apart from each other by the closure bars 6a, 6b. After the assembly of the other constituent elements of the exchangers, in particular the exchange corrugations, the distribution corrugations, etc., the stack is brazed in order to secure the elements of the exchangers to one another. Preferably, the plates and all or some of the other constituent elements of the exchanger are made of aluminium or of aluminium alloy.

A filler metal, known as braze or braze material, having a predetermined melting temperature, is arranged between the elements of the exchanger. As a preference, the predetermined melting temperature is comprised between 550 and 900° C., more preferably still between 550 and 650° C. The braze material 30 is preferably aluminium or an aluminium alloy.

Assembly is obtained by the melting and diffusion of the braze material within the parts to be brazed, without melting the latter. The plates, the fin spacing elements and the other constituent elements of the exchanger are pressed against each other by a compression device applying a compression force to the plates 2, which force typically ranges from 20,000 to 40,000 N/m². The stack is introduced into a vacuum furnace and is brazed at temperatures that may be comprised between 550 and 900° C., preferably between 550 and 650° C.

Figure 2:
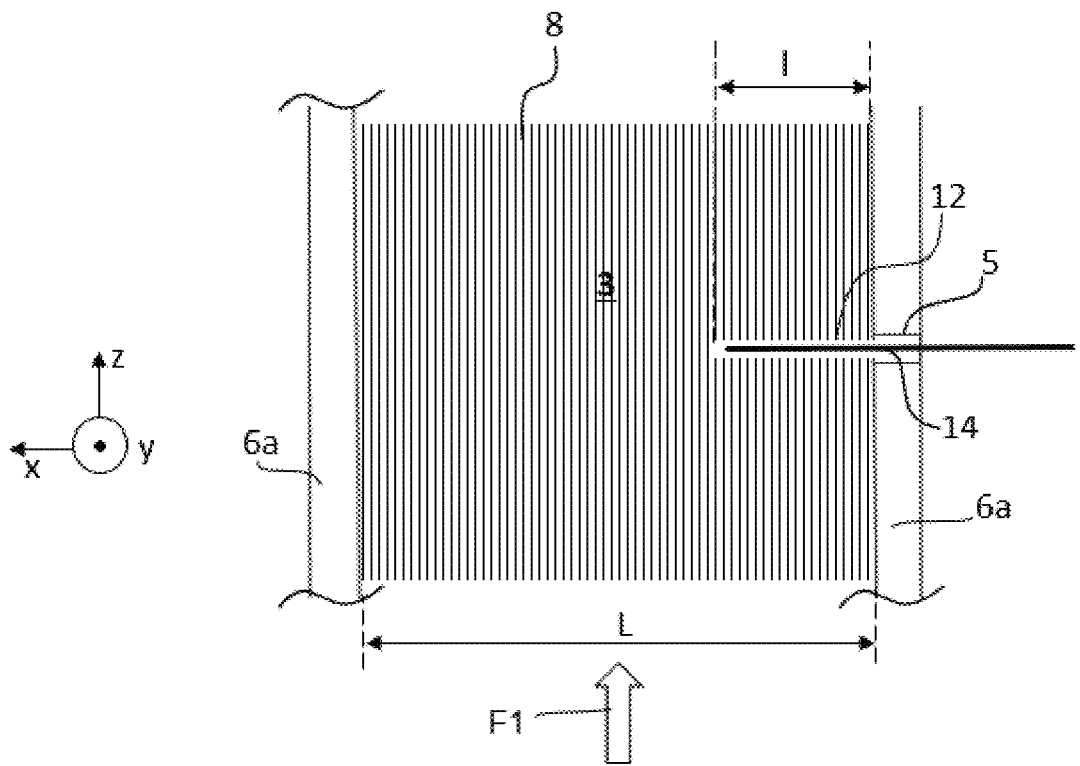
FIG. 2 is a schematic view in longitudinal section of a passage of an exchanger according to one embodiment of the invention.

As may be seen in FIG. 2, at least one slot 12 is formed across the exchange structure 8 in a direction parallel to the lateral direction x. The slot 12 is configured to receive at least one temperature probe 14. Note that the temperature probe may be fully or partially inserted into the slot 12.

According to the invention, the slot 12 extends, in the direction of stacking y, over a predetermined height h from the corrugation crests 121 of the exchange structure 8, the predetermined height h being greater than the thickness e of the corrugation crests 121.

The slot 12 extends from a region of localized interruption of the corrugations of the exchange structure 8 over a predetermined length, width and height, so as to form, within the passage 3, a region that is locally devoid of secondary exchange surfaces, so that the probe 14 can be introduced thereinto, perpendicular to the direction of longitudinal extent of the fins. An example of a slot 12 is shown in FIG. 4.

The invention enables direct measurement of the temperature of a fluid flowing in the passage 3, because the slot 12 passes through corrugation crests 121. A temperature probe arranged in the bottom of the slot thus finds itself in direct contact with the fluid flowing between the corrugation legs in the passage 3, under the corrugation crests 121, thereby allowing precise measurements to be taken. It is possible to take temperature measurements locally by selecting the dimensions and the positioning of the slot in the exchange structure.

Inserting the probe 14 perpendicular to the direction of flow of the fluid in the passage 3 allows the length of the probe introduced into the passage to be minimized and makes it possible to facilitate the manufacture of the slot through the exchange structure.

According to one option, the slot 12 may be formed within the exchange structure 8 by making a perforation through the structure. The perforation may be produced using machining, electrical-discharge machining, or cutting, particularly plasma-, laser- or waterjet cutting. As a preference, the perforation is produced using electrical-discharge machining. This is because this technique is simpler to implement than plasma cutting which requires more cumbersome and costly tooling. Furthermore, any risk of oxidation or corrosion phenomena occurring on the cutting edges and that may be incompatible with the brazing of the exchanger is avoided. Electrical-discharge machining also offers high machining precision, of around 5/100 of a mm, which is particularly well suited to exchange structures of small thickness, typically thicknesses of between 0.2 and 0.5 mm.

In the event that the structure 8 is formed of one or more corrugation pads 8a, 8b arranged consecutively in the passage 3 in the longitudinal direction z, the slot 12 is the result of a perforation made within at least one corrugation pad.

As a preference, the temperature probe 14 is inserted into the slot 12 after the phase of brazing the exchanger.

Alternatively or in addition, the exchange structure 8 may also be formed of several corrugation pads 8a, 8b arranged consecutively in the passage 3 in the longitudinal direction z and the slot 12 may be the result of a gap formed between two adjacent corrugation pads 8a, 8b. The width d of the slot 12, measured parallel to the longitudinal direction z, then corresponds to the width of this gap. As a preference, the gap is created during the stacking of the plates and the positioning of the exchange structures. The temperature probe is introduced into the gap after the phase of brazing the exchanger.

Advantageously, at least one retaining piece may be arranged in the slot 12 in order to position the probe 14 in the slot. The retaining piece comprises an orifice for the passage of the temperature probe 14 and is shaped in such a way as to be inserted into the slot 12, its exterior shape being the complement of the interior shape of the slot.

As a preference, the slot 12 has a cross section of square or rectangular shape. It is possible to envision other shapes of cross section, depending on the shape of the probe 14 that is to be housed, notably a semicircular shape.

Within the scope of the present invention, the temperature probe 14 can be any probe configured to take temperature measurements through contact. As a preference, the temperature probe 14 can be a resistance temperature probe, for example, a resistance probe, in particular a platinum resistance probe of the PT100 type, or even a thermocouple or thermistor temperature probe. This type of probe offers simplicity of use and great robustness, and the measurements they supply are not very sensitive to mechanical, particularly tensile and compressive, stresses, unlike fibre-optic sensors for example. Their use is therefore particularly advantageous for taking measurements in the passages of a brazed plate exchanger.

It is to be noted that the probe 14 introduced into the slot 12 means at least the heat-sensitive part of a sensor system, in particular the resistive circuit in the case of a resistance measurement or the measurement junction between the two conductive wires of a thermocouple, which junction is also called the hot junction. The other elements of the sensor that are necessary for taking the measurement, notably an electrical power supply device, an electrical-voltage measurement device, are arranged outside of the stack and connected to the probe 14 by suitable conducting wires, such as copper wires, thermocouple wires or extension leads. In the case of a thermocouple-type temperature probe 14, the probe 14 may comprise two electrically conducting wires welded together at one end to form the measurement junction, the wires being placed in the slot 12 either bare or inside a protective sheath, generally of cylindrical shape.

As a preference, the probe is configured in such a way as to be placed directly in contact with the fluid when the latter is circulating in a passage. In other words, there is no intermediate wall or element arranged around the heat-sensitive part, and in particular, there is no fluidtight sheath screwed in from the outside, as may be the case in the prior art. In this way, the dimension of the probe that interferes with the circulation of the fluid is greatly reduced and the responsiveness of the heat-sensitive part is improved because of the direct contact between the heat-sensitive part and the fluid.

As can be seen in the example of FIG. 4, the slot 12 has a predetermined height h which is preferably equal to at least 25% of the total height H and/or at most 75% of the total height H, preferably between 25 and 75%. That means that the probe can be positioned in the height of the passage while avoiding it touching the plates, because it is the temperature of the fluid that is to be measured directly. The predetermined height h of the slot 12 may potentially be equal to the total height H of the heat exchange structure 8, which is notably the case when the slot 12 is defined by a gap formed between two consecutive corrugation pads.

The slot 12 may have a width d, measured parallel to the longitudinal direction z, of between 0.6 and 5 mm, preferably between 1 and 4 mm.

As a preference, the width of the probe is defined in such a way that the disruption to the fluid is as low as possible, while at the same time offering sufficient space to accommodate the probe. As a preference, the probe arranged in the slot 12 is of cylindrical overall shape with a diameter which may be comprised between 0.5 mm and 4 mm, more preferably still, between 1 and 3 mm. The width d of the slot may be defined so that it is from 0.1 to 1 mm greater than the diameter of the probe. For example, in the case of a thermocouple temperature probe measuring 0.5 mm in diameter, the slot 12 may have a width of 0.6 mm.

The height and the width of the slot 12 are determined so that the probe 14 can be accommodated and a direct measurement taken within the flow of fluid, while at the same time introducing a somewhat insignificant amount of disturbance into the flow, as a result of a minimal effect on the cross section available for the passage of the fluid.

According to one option, an example of which is illustrated in FIG. 2, the slot 12 extends from an edge of the structure 8 arranged parallel to the longitudinal direction z to end within the structure 8. The structure 8 has a total length L measured in the lateral direction x, and the slot 12 extends, in the lateral direction x, over a predetermined length l which is preferably between 25 and 75% of the total length L. This configuration notably addresses a need to measure temperature in a region close to the edge of the passage 3, so as to be able to measure the temperature of the fluid as far as the middle of the passage, which is where the hydraulic and thermal interferences with the solid and conducting bars are reduced. Preferably, the length l is between 300 and 900 mm.

According to another option (which is not illustrated), at least one slot 12 may pass right through the exchange structure 8, which is to say that its length l is equal to the total length L of the structure 8. This is notably the case when the slot 12 is defined by a gap formed between two consecutive corrugation pads. Because the slot 12 passes through the entire width of the passage 3, it is possible to take measurements at various positions across the width of the passage, depending on the position of the heat-sensitive part of the probe 14 in the slot 12, and this notably allows potential inhomogeneities in the distribution of the fluid across the width of the passage to be revealed. Several measurement points may also be provided by positioning several heat-sensitive parts along the length of the slot 12.

As a preference, the at least one passage 3 is delimited between two closure bars 6a extending parallel to the longitudinal direction z and each comprising at least one recess 5 arranged in the continuation of the slot 12. The recess 5 communicates on the one hand with the slot 12 and on the other hand with the outside of the stack.

Having a through-slot 12 thus allows an insertion method whereby a capillary is introduced into the slot 12 via one end of the slot 12, preferably into the orifice of a retaining piece as described hereinabove, and then the probe is introduced into the capillary so that it is guided as far as its final position, after which the capillary is finally withdrawn via an opposite end of the slot 12, leaving the probe 14 in position in the slot 12.

Figure 3:
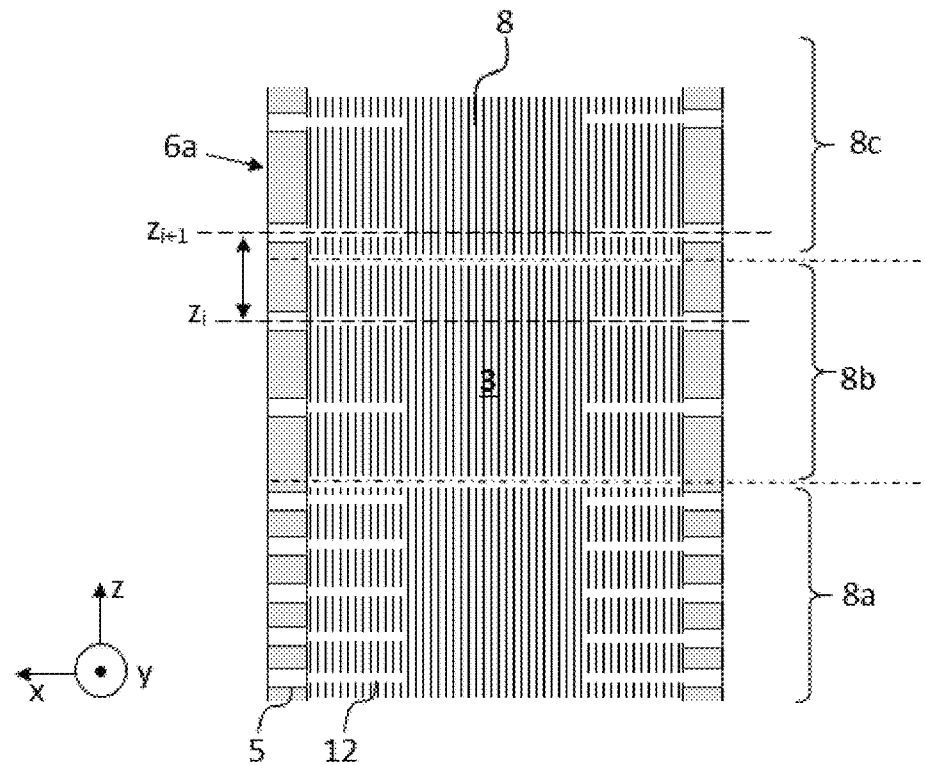
FIG. 3 is a schematic view in longitudinal section of a passage of an exchanger according to one embodiment of the invention.

With reference to FIG. 3, the passage 3 delimited between two opposite closure bars 6a comprises an exchange structure comprising at least one pair of slots 12 which extend from each closure bar 6a facing one another.

Arranging the probes on either side of the passage 3 makes it possible to check that the fluid is correctly distributed homogeneously across the width of the passage. Because the exchange of heat in the passage is connected with the fluid flow rate in the vicinity of the probes, comparing temperatures which are measured on either side of the passage makes it possible to establish whether the fluid flow rate is different. Furthermore, the probes make it possible to monitor temperature behaviours that are transient over the course of time and to assess any thermal shock to which the exchanger might be subjected.

Advantageously, the exchange structure 8 comprises a plurality of slots 12 positioned along the longitudinal direction z at predetermined intervals. That means that the temperature of the fluid, and therefore the change in temperature thereof, can be measured locally at various positions along the length of the exchanger, as it gradually exchanges heat with another fluid circulating in an adjacent passage. This then yields information regarding the physical phenomena which may take place within the exchanger, notably phase changes, chemical reactions, and regarding the location of same within the exchanger.

In particular, the structure 8 may comprise several pairs of slots 12 extending opposite each other from opposite closure bars 6a, i.e. from opposite edges of the passage 3. Stated differently, the opposing slots 12 occupy the same positions zi along the closure bars.

In fact, all or part of the closure bars 6a of one or more passages 3 of the exchanger may comprise a plurality of slots 12 positioned at predetermined intervals in the longitudinal direction z. An interval is defined as being the distance separating two slots 12 that extend from the one same bar. The arrangement of a plurality of slots makes it possible to measure temperatures at different positions along the length and/or across the width of the exchanger, in particular in order to determine where different reactions or changes of phase take place. In this way, a map of the physicochemical phenomena that can occur in the exchanger is obtained. The arrangement of slots with probes on different passages also allows a comparison to be made between the temperature distributions in passages situated at different heights in the exchanger stack.

The predetermined intervals may vary along at least part of the exchange structure 8, so that fluid temperatures can be measured locally at the desired locations. As a preference, the intervals between the slots 12 increase in the longitudinal direction z, along all or part of the structure 8. Note that the increase may be a progressive increase, from one slot to another, or an increase in the form of step changes, namely where the interval between a number of successive slots may be constant over at least one portion of the structure, then increased over the next portion.

This is because it may be beneficial to map the fluid temperatures more finely in the bottom part of the passage, at or near its point of introduction, because phenomena of inhomogeneity in the distribution of the fluid, notably inhomogeneity in terms of flow rate or of distribution between two phases in the case of a fluid in a liquid/gas biphasic state for example, may arise. These poor-distribution phenomena manifest themselves in the form of local variations in temperature. In particular, in the case of a biphasic fluid, the liquid phase has a far greater refrigerating capacity than the gaseous phase, which means that a variation in the liquid/gas volume ratio manifests itself in a variation in the temperature of the fluid that it is advantageous to be able to measure.

According to one embodiment, the structure 8 is divided, in the longitudinal direction z, into at least two portions 8a, 8b, that one 8b of the two portions that is situated downstream of the other one having intervals between the slots 12 that are greater than the intervals of the other one 8a of the two portions. Note that the term "downstream" is to be understood with reference to the direction in which the fluid flows in the passage concerned.

Thus, FIG. 3 illustrates an example in which the intervals between the slots 12 increase along the longitudinal direction z. The increase occurs between successive portions 8a, 8b, 8c, which may be formed by successive corrugations pads 8a, 8b, 8c. The intervals are constant within each portion.

In one embodiment, an example of which is illustrated in FIG. 4, the exchange structure 8 is a corrugation with a partial offset, also referred to as a "serrated fin" corrugation. This type of corrugated fin comprises several corrugations 81, 82 each comprising a series of corrugation crests 121 and corrugation troughs 122 alternately connected by a succession of fins 123. The corrugations 81, 82 are arranged consecutively in the direction z with at least some of said corrugations having a predetermined offset in the lateral direction x with respect to another, adjacent, corrugation. The corrugations 81, 82 have mutually parallel directions of corrugation.

Advantageously, at least one slot 12 is formed within one of the corrugations of the serrated fin. Each corrugation 81, 82 has a length known as the serration length Ls measured in the longitudinal direction z. As a preference, the width d of the slot 12 is comprised between 15 and 90%, preferably between 20 and 50% of the serration length Ls. That allows the mechanical integrity and stiffness of the exchange structure 8 to be maintained. Furthermore, it is necessary for the width d to be less than the serration length in order for the corrugations to hold together. As a preference, the width d is comprised between 0.6 and 5 mm, preferably between 1 and 4 mm.

FIG. 5 illustrates an embodiment in which the temperature probe 14 projects to outside the stack via the recess 5 in a closure bar 6a and then via a coupling 15 which is fixed to the closure bar 6a in the continuation of the recess 5. The coupling 15 is configured to ensure a fluidtight seal between the recess 5 and the outside of the stack. As a preference, the coupling 15 is fixed to the bar 6a by welding.

As may be seen in FIG. 5, the slot 12 extends between a first end 12a, via which the temperature probe 14 is introduced when it is being mounted in the passage 3, and a second end 12b, arranged within the passage 3 and accepting the end of the probe 14 at the level of which the heat-sensitive part 14a is situated. Advantageously the slot 12 has, at one and/or the other of said first and second ends 12a, 12b, an increase in its width and/or in its height so as to form a first cavity and/or a second cavity at said first and/or second ends 12a, 12b.

The cavity situated on the side of the closure bar 6a facilitates the introduction of the probe 14 and limits the risk of it becoming damaged during this introduction. The cavity situated further inside the passage 3 makes it possible to avoid any risk of the heat-sensitive part of the probe 14 being in contact with the exchange structure 8. This then ensures contact only with the fluid circulating in the passage 3, thereby guaranteeing the precision of the temperature measurement. As a preference, a cavity is provided at each end of the slot 12. It should be noted that this slot configuration is not restricted solely to the embodiment of FIG. 5 and that it is applicable to any type of arrangement of slots according to the invention.

As a preference, the cavity or cavities are the result of a 30 to 100% increase in the height h and/or the width d of the slot 12. As a preference, provision is made for the slot 12 to be enlarged on both its height and its width.

Of course, the invention is not limited to the particular examples described and illustrated in the present application. Further variants or embodiments within the competence of a person skilled in the art may also be envisaged without departing from the scope of the invention defined in the following claims. It will noted in particular that several passages of the exchanger, which are intended for the flow of fluids which may or may not be different, may have at least one slot according to the invention, it being possible for these passages to have different configurations, particularly a different numbers of slots, different shapes and/or different distributions along the passages.

What is claimed is:

1. A heat exchanger of the brazed plate and fin type comprising a stack of plates arranged parallel to one another and to a longitudinal direction (z) so as to define, between said plates, a plurality of passages suitable for the flow of at least a first fluid in the longitudinal direction (z), at least one exchange structure of corrugated shape being arranged between two successive plates and comprising corrugation crests and corrugation troughs connected alternately by a succession of fins, said fins succeeding one another in a lateral direction (x) which is orthogonal to the longitudinal direction (z) and which defines a direction of corrugation of the exchange structure (8), and the corrugation crests and troughs being arranged against the plates and having a thickness (e) measured parallel to a direction of stacking (y) which is perpendicular to the longitudinal direction (z) and to the lateral direction (x), the exchange structure having a total height (H) measured parallel to a direction of stacking (y), wherein at least one slot is formed through the exchange structure in a direction perpendicular to the longitudinal direction (z), a temperature probe being arranged in the slot, said slot being formed from the corrugation crests over a predetermined height (h), measured in the direction of stacking (y), which is greater than the thickness (e) of the corrugation crests, wherein the exchange structure comprises several corrugation pads juxtaposed in the longitudinal direction (z), at least one second slot being defined by a gap formed between two adjacent corrugation pads.

2. A heat exchanger of the brazed plate and fin type comprising a stack of plates arranged parallel to one another and to a longitudinal direction (z) so as to define, between said plates, a plurality of passages suitable for the flow of at least a first fluid in the longitudinal direction (z), at least one exchange structure of corrugated shape being arranged between two successive plates and comprising corrugation crests and corrugation troughs connected alternately by a succession of fins, said fins succeeding one another in a lateral direction (x) which is orthogonal to the longitudinal direction (z) and which defines a direction of corrugation of the exchange structure (8), and the corrugation crests and troughs being arranged against the plates and having a thickness (e) measured parallel to a direction of stacking (y) which is perpendicular to the longitudinal direction (z) and to the lateral direction (x), the exchange structure having a total height (H) measured parallel to a direction of stacking (y), wherein at least one slot is formed through the exchange structure in a direction perpendicular to the longitudinal direction (z), a temperature probe being arranged in the slot, said slot being formed from the corrugation crests over a predetermined height (h), measured in the direction of stacking (y), which is greater than the thickness (e) of the corrugation crests,
wherein the passages are delimited by closure bars positioned between the plates), at least one closure bar extending parallel to the longitudinal direction (z) and comprising at least one recess, said recess communicating on the one hand with the slot and on the other hand with the outside of the stack,
wherein the temperature probe projects to outside the stack via the recess and then via a coupling which is fixed to the closure bar in the continuation of the recess, the coupling being configured to ensure a fluidtight seal between the recess and the outside of the stack.

3. A heat exchanger of the brazed plate and fin type comprising a stack of plates arranged parallel to one another and to a longitudinal direction (z) so as to define, between said plates, a plurality of passages suitable for the flow of at least a first fluid in the longitudinal direction (z), at least one exchange structure of corrugated shape being arranged between two successive plates and comprising corrugation crests and corrugation troughs connected alternately by a succession of fins, said fins succeeding one another in a lateral direction (x) which is orthogonal to the longitudinal direction (z) and which defines a direction of corrugation of the exchange structure (8), and the corrugation crests and troughs being arranged against the plates and having a thickness (e) measured parallel to a direction of stacking (y) which is perpendicular to the longitudinal direction (z) and to the lateral direction (x), the exchange structure having a total height (H) measured parallel to a direction of stacking (y), wherein at least one slot is formed through the exchange structure in a direction perpendicular to the longitudinal direction (z), a temperature probe being arranged in the slot, said slot being formed from the corrugation crests over a predetermined height (h), measured in the direction of stacking (y), which is greater than the thickness (e) of the corrugation crests,
wherein the exchange structure comprises the plurality of slots positioned along the longitudinal direction (z) at predetermined intervals,
wherein the predetermined intervals vary along at least part of the exchange structure, the intervals increasing in the longitudinal direction (z).

* * * * *